(12) United States Patent
Martin et al.

(10) Patent No.: US 7,630,992 B2
(45) Date of Patent: Dec. 8, 2009

(54) SELECTIVE LATENT SEMANTIC INDEXING METHOD FOR INFORMATION RETRIEVAL APPLICATIONS

(75) Inventors: Jacob Gilmore Martin, Jacksonville, FL (US); Earl Rodney Canfield, Athens, GA (US)

(73) Assignee: Selective, Inc., Jacksonville, FL (US)

( * ) Notice: Subject to any disclaimer, the term of this patent is extended or adjusted under 35 U.S.C. 154(b) by 321 days.

(21) Appl. No.: 11/505,654

(22) Filed: Aug. 17, 2006

(65) Prior Publication Data

US 2007/0124299 A1    May 31, 2007
US 2007/0233669 A2    Oct. 4, 2007

Related U.S. Application Data

(60) Provisional application No. 60/740,700, filed on Nov. 30, 2005.

(51) Int. Cl.
G06F 17/30 (2006.01)
G06F 17/00 (2006.01)

(52) U.S. Cl. ..................................................... 707/100
(58) Field of Classification Search ........................ None
See application file for complete search history.

(56) References Cited

U.S. PATENT DOCUMENTS

| | | | |
|---|---|---|---|
| 4,839,853 A | 6/1989 | Deerwester et al. | |
| 6,122,628 A | 9/2000 | Castelli et al. | |
| 6,678,690 B2 | 1/2004 | Kobayashi et al. | |
| 6,922,715 B2 | 7/2005 | Kobayashi et al. | |
| 6,965,898 B2 | 11/2005 | Aono et al. | |
| 6,965,900 B2 | 11/2005 | Srinivasa et al. | |
| 7,024,400 B2 | 4/2006 | Tokuda et al. | |
| 2002/0013801 A1* | 1/2002 | Kobayashi et al. | 708/607 |
| 2003/0159106 A1 | 8/2003 | Aono et al. | |
| 2004/0220944 A1 | 11/2004 | Behrens et al. | |

OTHER PUBLICATIONS

Richards et al., "Matrices, Vector Spaces, and Information Retrieval", Dec. 13, 2002, pp. 1-16.*
Berry et al., "Matrices, Vector Spaces, and Information Retrieval", Jun. 1999, Society for Industrial and Applied Mathematics, vol. 41, pp. 335-362.*
Corless et al., "Singular Value Decomposition for Polynomial Systems", 1995, ACM Press, pp. 195-207.*
Potts et al., "Semantics of Exact Real Arithmetic", Jul. 1997, IEEE Computer Society, p. 248.*

(Continued)

*Primary Examiner*—James Trujillo
*Assistant Examiner*—Dawaune Conyers
(74) *Attorney, Agent, or Firm*—King & Spalding LLP (57) ABSTRACT

A term-by-document (or part-by-collection) matrix can be used to index documents (or collections) for information retrieval applications. Reducing the rank of the indexing matrix can further reduce the complexity of information retrieval. A method for index matrix rank reduction can involve computing a singular value decomposition and then retaining singular values based on the singular values corresponding to singular values of multiple topics. The expected singular values corresponding to a topic can be determined using the roots of a specially formed characteristic polynomial. The coefficients of the special characteristic polynomial can be based on computing the determinants of a Gram matrix of term (or part) probabilities, a method of recursion, or a method of recursion further weighted by the probability of document (or collection) lengths.

29 Claims, 7 Drawing Sheets

OTHER PUBLICATIONS

Brezin et al., "Characteristic Polynomials of Random Matrices", 2000, Communications in Mathematical Physics, vol. 214, Issue 1, pp. 111-135.*

C. H. Papadimitriou, P. Raghavan, H. Tamaki, S. Vempala, Latent semantic indexing: a probabilistic analysis, J. Comput. System Sci. 61 (2) (2000) 217-235.

S. T. Dumais, G. W. Furnas, T. K. Landauer, S. Deerwester, R. Harshman, Using latent semantic analysis to improve access to textual information, in: Proceedings of ACM CHI'88 Conference on Human Factors in Computing Systems, Innovative Information Access, 1988, pp. 281-285.

G. W. Stewart, On the early history of the singular value decomposition, SIAM Rev. 35 (4) (1993) 551-566.

R. Homayouni, K. Heinrich, L. Wei, M. W. Berry, Gene clustering by latent semantic indexing of MEDLINE abstracts, Bioinformatics 21 (1) (2005) 104-115.

C. H. Q. Ding, A similarity-based probability model for latent semantic indexing, in: SIGIR, 1999, pp. 58-65.

Y. Azar, A. Fiat, A. R. Karlin, F. McSherry, J. Saia, Spectral analysis of data, in: STOC, 2001, pp. 619-626.

J. K. Seppanen, E. Bingham, H. Mannila, A simple algorithm for topic identification in 0-1 data, in: PKDD, 2003, pp. 423-434.

T. Hofmann, Probabilistic latent semantic indexing, in: SIGIR, 1999, pp. 50-57.

A. Telenti, Keynote speech, in: The 3rd International AIDS Society Conference on HIV Pathogenesis and Treatment, 2005.

G. Sherlock, Analysis of large-scale gene expression data, Briefings in Bioinformatics 2 (4) (2001) 350-362.

O. Alter, P. O. Brown, D. Botstein, Singular value decomposition for genome-wide expression data processing and modeling, Proc Natl Acad Sci U S A 97 (18) (2000) 10101-10106.

M. E. Wall, P. A. Dyck, T. S. Brettin, SVDMAN-singular value decomposition analysis of microarray data, Bioinformatics 17 (6) (2001) 566-568.

S.-K. Ng, Z. Zhu, Y.-S. Ong, Whole-genome functional classification of genes by latent semantic analysis on microarray data, in: Y.-P. P. Chen (Ed.), Second Asia-Pacific Bioinformatics Conference (APBC 2004), Jan. 18-22, 2004, Dunedin, New Zealand, vol. 29 of CRPIT, Australian Computer Society, 2004, pp. 123-129.

D. Higham, G. Kalna, J. K. Vass, Analysis of the singular value decomposition as a tool for processing microarray expression data, Tech. Rep. 01-2005, University of Strathclyde Mathematics (2005).

O. Troyanskaya, M. Cantor, G. Sherlock, P. Brown, T. Hastie, R. Tibshirani, D. Botstein, R. B. Altman, Missing value estimation methods for DNA microarrays, Bioinformatics 17 (6) (2001) 520-525, evaluation Studies.

A. M. Jeffrey, X. Xia, I. K. Craig, When to initiate HIV therapy: a control theoretic approach, IEEE Trans Biomed Eng 50 (11) (2003) 1213-1220, evaluation Studies.

M. L. Teodoro, G. N. Phillips, L. E. Kavraki, A dimensionality reduction approach to modeling protein flexibility, in: RECOMB '02: Proceedings of the sixth annual international conference on Computational biology, ACM Press, New York, NY, USA, 2002, pp. 299-308.

M. L. Teodoro, G. N. Phillips, L. E. Kavraki, Singular value decomposition of protein conformational motions: Application to HIV-1 protease (Aug. 30, 2000).

S. Hui, FlexSADRA: Flexible structural alignment using a dimensionality reduction approach, University of Waterloo, Ontario, Canada, 2005.

P. N. Nyambi, A. Nadas, H. A. Mbah, S. Burda, C. Williams, M. K. Gorny, S. Zolla-Pazner, Immunoreactivity of intact virions of human immunodeficiency virus type 1 (HIV-1) reveals the existence of fewer HIV-1 immunotypes than genotypes, J Virol 74 (22) (2000) 10670-10680.

D. Ghosh, Singular value decomposition regression models for classification of tumors from microarray experiments, in: Pacific Symposium on Biocomputing, 2002, pp. 18-29.

Y. Fu, T. Bauer, J. Mostafa, M. Palakal, S. Mukhopadhyay, Concept extraction and association from cancer literature, in: R. H. L. Chiang, E.-P. Lim (Eds.), Fourth ACM CIKM International Workshop on Web Information and Data Management (WIDM 2002), SAIC Headquaters, McLean, Virginia, USA, Nov. 8, 2002, ACM; 2002; pp. 100-103.

D. Horn, I. Axel, Novel clustering algorithm for microarray expression data in a truncated SVD space, Bioinformatics 19 (9) (2003) 1110-1115.

E. Huang, S. H. Cheng, H. Dressman, J. Pittman, M. H. Tsou, C. F. Horng, A. Bild, E. S. Iversen, M. Liao, C. M. Chen, M.West, J. R. Nevins, A. T. Huang, Gene expression predictors of breast cancer outcomes, Lancet 361 (9369) (2003) 1590-1596.

T. O. Nielsen, R. B.West, S. C. Linn, O. Alter, M. A. Knowling, J. X. O'Connell, S. Zhu, M. Fero, G. Sherlock, J. R. Pollack, P. O. Brown, D. Botstein, M. van de Rijn, Molecular characterisation of soft tissue tumours: a gene expression study, Lancet 359 (9314) (2002) 1301-1307.

M. West, C. Blanchette, H. Dressman, E. Huang, S. Ishida, R. Spang, H. Zuzan, J. A. Olson, J. R. Marks, J. R. Nevins, Predicting the clinical status of human breast cancer by using gene expression profiles, Proc Natl Acad Sci U S A 98 (20) (2001) 11462-11467.

B. Jarzab, M. Wiench, K. Fujarewicz, K. Simek, M. Jarzab, M. Oczko-Wojciechowska, J. Wloch, A. Czarniecka, E. Chmielik, D. Lange, A. Pawlaczek, S. Szpak, E. Gubala, A. Swierniak, Gene expression profile of papillary thyroid cancer: sources of variability and diagnostic implications, Cancer Res 65 (4) (2005) 1587-1597.

Bekas et al., "Polynomial filtered Lanczos iterations with applications in Density Functional Theory," Computer Science and Engineering Dept. University of Minnesota, Jul. 15, 2005, pp. 1-24.

* cited by examiner

SELECTIVE LATENT SEMANTIC INDEXING METHOD FOR INFORMATION RETRIEVAL APPLICATIONS

RELATED APPLICATION

This patent application claims priority under 35 U.S.C. § 119 to U.S. Provisional Patent Application No. 60/740,700, entitled "Predicting a Topic's Singular Values and Singular Vectors to Provide a New Type of Low Rank Approximation for Information Retrieval Applications," filed Nov. 30, 2005. The complete disclosure of the above-identified priority application is hereby fully incorporated herein by reference.

TECHNICAL FIELD

The present invention is generally directed to computer-based information retrieval systems. More particularly, the present invention relates to avoiding the loss of topical coverage and increasing information retrieval performance when using reduced rank models in computer-based information retrieval systems.

BACKGROUND OF THE INVENTION

Computer-based information systems can store large amounts of data. Despite the potentially enormous size of such data collections, information retrieval queries over a dataset attempt to be as informative, rapid, and accurate as possible. Information retrieval systems often employ indexing techniques to improve precision, improve recall performance and rapidly access specific information within a dataset.

Data stored in an information retrieval system for textual data can be indexed using a term-by-document matrix. In that case, "term" means a word or phrase and a "document" is a collection of terms. However, generalized meanings of "term" and "document" can apply, as discussed hereinafter. A term-by-document matrix represents each term as a row and each document as a column. For a column representing a particular document, the elements going down the column can represent some function of the existence of terms within the document. For example, if term A is not used in document B, then the element in a term-by-document matrix that is in both row A and column B could be a zero to represent the absence of the term in the document. Alternatively, if term A is used X times in document B, then the element in a term-by-document matrix that is in both row A and column B could be an X to represent the presence of the term A occurring X number of times in the document.

This term-by-document matrix structure enables response to keyword search queries. The row of the term-by-document matrix that corresponds to the queried keyword is examined by the information retrieval system. Elements in that row indicate inclusion of that keyword term within the documents represented by those columns. Such inclusion prompts the information retrieval system to return the documents in response to the keyword query. Thus, the search returns the documents containing a specific keyword by examining a single matrix. Once this term-by-document matrix is constructed, the individual documents within a dataset do not need to be searched when forming a response to a keyword query.

Furthermore, the elements of the term-by-document matrix can include a measure of the relevance of the term (given by the row) to the document (given by the column). This measure can be as simple as a count of how many times the term occurs within the document. Likewise, a more involved metric can be employed. Forming a term-by-document matrix with such elements lends to statistical notions for the use of the matrix and enables more detailed query responses. For example, a response to a keyword query can be a list of documents containing a keyword and that list can be ordered such that the documents most relevant to the keyword are listed first. The most relevant documents can be those documents that include the most instances of the keyword.

For extremely large sets of documents with multiple keyword terms, the term-by-document matrix can become too large to manipulate during a keyword query. For this reason, simplification techniques can be employed that approximate the term-by-document matrix with a simpler matrix that is less time consuming to manipulate. Conventional Latent Semantic Indexing (LSI) employs a reduced rank version of the term-by-document matrix as an approximation of the original matrix. The approximation obtained has also been shown to be useful in increasing the overall information retrieval performance.

The LSI approach seeks to factor the term-by-document matrix using Singular Value Decomposition (SVD) and then makes some of the smallest singular values equal to zero, thereby leaving a reduced rank approximation of the term-by-document matrix. To achieve an approximation of the term-by-document matrix that is of reduced rank k, the conventional LSI approach only retains the k largest singular values and sets all of the other singular values to zero. The resultant matrix is an approximation of the original term-by-document matrix but with a lower rank of k (i.e., including only the k largest singular values).

Generating a reduced rank approximation of the term-by-document matrix is useful for reducing the computational complexity of indexed information retrieval. It is also said that it can produce a matrix that can be considered less "noisy." Such a reduced rank matrix also can retrieve related term entries that would have been excluded based on the original term-by-document matrix due to synonymy. The reduced rank matrix can associate words that never actually appear together in the same document.

Such rank reduction is not lossless. Making some of the singular values equal to zero reduces the rank of a matrix and invariably removes some information. When using the conventional LSI techniques, one example of a loss that can be introduced is a loss of topical coverage. A topic is generally conceptualized as a subject addressed within the documents of the dataset. Mathematically, a topic can be considered a probability distribution over all terms. For example, the term "hexagon" is perhaps more probabilistically likely to be related to a topic of a mathematical nature than it would be to a topic of a historical nature.

Conventional LSI rank reduction does not always maintain coverage of all topics. The blind selection of the k largest singular values can result in the removal of information that loses the connection between a topic and certain keywords. Retaining only the largest singular values can allow the term-document relationships of more common topics to dominate the reduced rank matrix at the cost of the removal of the term-document relationships of less frequently represented topics.

Thus, there is a need in the art for a rank reduction technique that retains the general benefits of the conventional LSI approach while attempting to maintain topical coverage during rank reduction of the term-by-document indexing matrix. More particularly, a need exists in the art for selectively identifying the singular values of interest related to a dataset that has been annotated and stored in some matrix format.

SUMMARY OF THE INVENTION

The inventive method of Selective Latent Semantic Indexing (SLSI) comprises a technique for reducing the rank of a term-by-document matrix in a way that can reduce or prevent the loss of topical coverage and that can give control over the amounts of each topic to cover. The method can begin by forming a term-by-document matrix and expanding the matrix via Singular Value Decomposition (SVD). However, instead of simply retaining the largest singular values, the SLSI method can determine which singular values to retain using information about how the singular values relate to the topics. Identifying the singular values that correspond to particular topics can enable the selection of specific singular values to retain and to abandon so as to retain any possible coverage of all topics of interest spanned by the documents.

The SLSI method can establish a partition of the singular values into groups corresponding to each topic. This partitioning can be performed using a technique for estimating the singular values that correspond to each topic. The estimated singular values approximate the singular values obtained from the SVD to identify a mapping between the SVD singular values and the topics. Once the singular values are partitioned by topic, the selection of singular values to retain in the reduced rank term-by-document matrix can be made with knowledge of the partitioning.

One skilled in the art will appreciate that references to terms and documents are non-limiting examples. The inventive method for indexing terms and documents can just as well address indexing of genes within individuals; atoms within molecules; elements within sets; or any general parts within collections. One skilled in the art will appreciate that such generalization from terms within documents to the indexing of parts within collections occurs without departing from the scope or spirit of the invention.

The method of Selective Latent Semantic Indexing presented in this summary is for illustrative purposes only. Various aspects of the present invention can be more clearly understood and appreciated from a review of the following detailed description of the disclosed embodiments and by reference to the drawings and any claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are included within this description, are within the scope of the present invention, and are protected by any accompanying claims.

DETAILED DESCRIPTION OF EXEMPLARY EMBODIMENTS

The inventive information retrieval method can comprise steps for selecting certain singular values to retain in a reduced rank approximation of a term-by-document indexing matrix. The selection of singular values can comprise steps for ensuring that all desired topics covered by the documents are retained after the rank reduction process. The inventive rank reduction method can ensure this retention of topical coverage by using information identifying the singular values that correspond to certain topics. For example, when selecting which singular values to retain, this information can be used to ensure that at least one singular value is retained corresponding to each desired topic.

The information identifying the singular values corresponding to certain topics can be obtained by estimating the singular values of each topic and then identifying the actual singular values of the term-by-document matrix that are closest to the estimated singular values. This process can be repeated for all desired topics. Once the matching is performed between the estimated singular values for each topic and all of the actual singular values of the term-by-document matrix, the result is a partitioning, by topic, of the actual term-by-document singular values. Then, the selection of singular values to retain in the reduced rank term-by-document matrix can be made. This partitioning method can allow retaining any combination of singular values from each desired partition, the partition being desired if loss of coverage of the topic corresponding to that partition is undesirable.

A number of methods can be employed to select the singular vectors that correspond to a particular estimated singular value. These include choosing multiple singular vectors for one expected singular value. For instance, if an estimated singular value is selected, there could be several actual singular vectors that correspond to actual singular values that are close to the estimated singular value. In this case, one, some, or even all of the candidate actual singular vectors can be selected.

Estimating the singular values of a topic can be carried out by finding the roots of a specially formed characteristic equation. The coefficients of the characteristic equation can be calculated explicitly. Alternatively, the coefficients can be calculated more efficiently using a recursion method. It is also possible to calculate the coefficients of the characteristic equation in a manner that probabilistically weights the contribution from documents of varying length.

The inventive singular value estimation method can estimate the singular values of term-by-document matrices that are based on various term metrics. One example of such a metric uses "0" and "1" by placing a "1" in the matrix if the term exists at least once in the corresponding document and placing a "0" in the matrix if the term is not present in the document. Another example of such a metric uses "−1" and "1" by placing a "1" in the matrix if the term exists at least once in the corresponding document and placing a "−1" in the matrix if the term is not present in the document. Yet another example metric uses a term frequency technique where the value of each element in the matrix represents how often the corresponding term appears within the corresponding document. This value can represent an absolute count of the occurrences of the term, it can represent the logarithm of an absolute count of the occurrences of the term, it can represent the proportionality of the occurrence among all of the terms, or it can represent a weighted proportion. Various other term-by-document matrix formations will be apparent to those of ordinary skill in the art. The inventive method can operate with any representation of the term-by-document matrix without departing from the scope or spirit of the invention.

One of ordinary skill in the art will appreciate that embodiments of the inventive method can comprise software or firmware code executing on a microcontroller, microprocessor, or DSP processor; state machines implemented in application specific or programmable logic; or numerous other forms without departing from the spirit and scope of the invention. The invention can be provided as a computer program which can include a machine-readable medium having stored thereon instructions which can be used to program a computer (or other electronic devices) to perform a process according to the invention.

The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Certain steps in the processes or process flows described in all of the logic flow diagrams referred to below must naturally precede others for the invention to function as described. However, the invention is not limited to the order of the steps described if such order or sequence does not alter the functionality of the present invention. That is, it is recognized that some steps can be performed before, after, or in parallel with other steps without departing from the scope and spirit of the present invention.

Further, one of ordinary skill in the art would be able to write such a computer program or to identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining figures illustrating other logical process flows.

Figure 1:
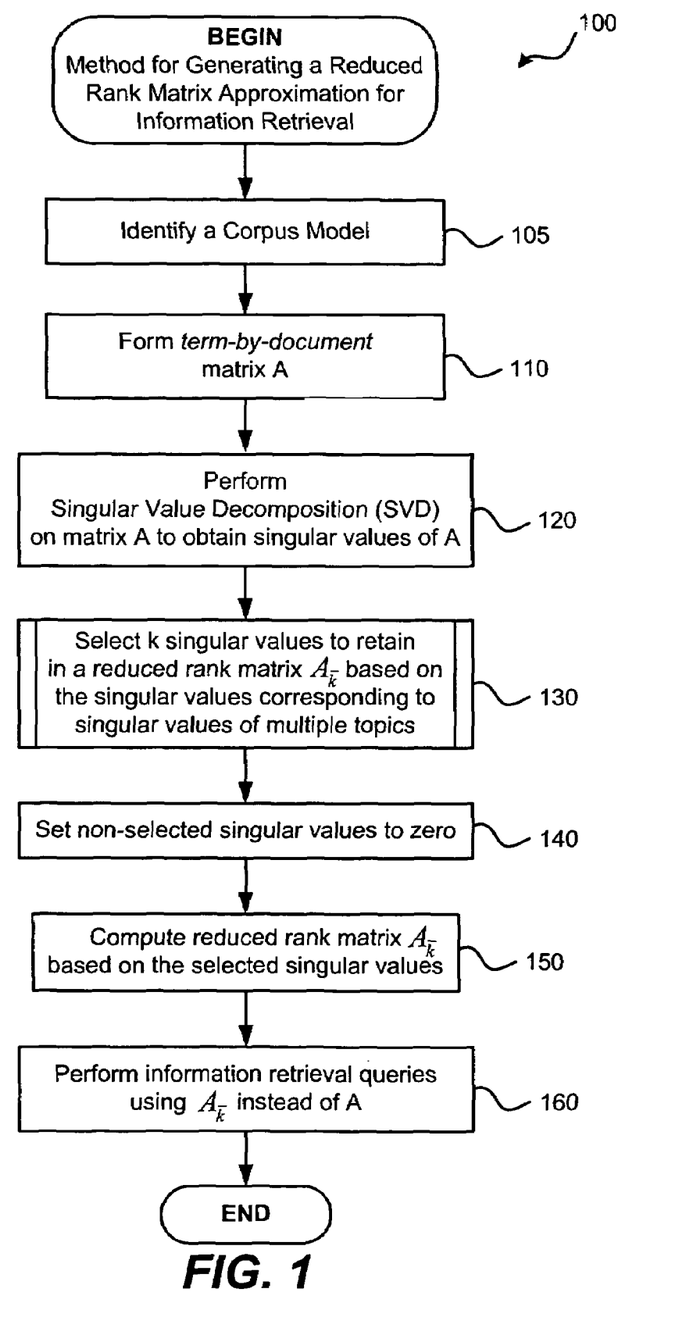
FIG. 1 is a logical flow diagram depicting a method for selectively generating a reduced rank matrix approximation for information retrieval according to an exemplary embodiment of the invention.

Turning now to the drawings, in which like reference numerals refer to like elements or steps, FIG. 1 is a logical flow diagram depicting a method 100 for selectively generating a reduced rank matrix approximation for information retrieval according to an exemplary embodiment of the invention. In initial step 105, a corpus model is identified. The corpus model is a probabilistic matrix model representing the probability of all terms within all topics, the probability of a topic appearing in a document collection, the document length probabilities within the topics, and the type of function used to create the term-by-document matrix. This corpus model can be the source of the probability distributions used in this method.

The corpus model can be identified by estimating the model or the method can be provided the model as an input. Given a document collection, realistic simplifications can be made about the corpus model underlying it. For example, topics will usually not have the same number of document representatives. Some documents in a given collection will be more or less popular. In addition, any given topic will usually have some terms that are much more common within that topic than other terms are.

Random sampling and trivial data analysis techniques, apparent to one skilled in the art, lead to the ability to make realistic assumptions about the approximate parameters of a corpus model that would generate a given collection of documents. For example, an algorithm can discover which terms correspond to disjoint topics by using techniques familiar to those skilled in the art of information retrieval. One example method for discovering the topics can be to compute several reduced rank-k LSI approximations of a term-by-document matrix A to find the sets of terms that are used most similarly across a collection of documents. Other techniques for determining the terms that are in each topic will be apparent to one of ordinary skill in the art. Term frequency counts within a particular topic can be calculated which will give an estimate of the term distributions within a topic. Document lengths and topic probabilities can also be estimated by sampling, giving every parameter of a corpus model that could have generated a collection of documents. With this information and the inventive SLSI process, the expected singular values that correspond to each topic can be identified with high probability.

In step 110, a term-by-document matrix A is formed. This matrix is an indexing matrix that can be used to identify the documents containing a certain term or terms. The matrix A can be formed by explicitly examining each term in each document of the set of documents to be searched. Alternatively, an exemplary matrix A can be formed from a statistical model of the type of documents contained in the document set. The inventive method 100 can be used to produce and employ a reduced rank approximation of this matrix for information retrieval.

In step 120, the singular values of the matrix are computed. These singular values can be computed using singular value decomposition (SVD), which yields the singular values together with their corresponding singular vectors. When the outer product of the singular vectors of a matrix are each multiplied by their corresponding singular value and then summed together, the result is the original matrix. In other words, the result of the SVD is the decomposition of a matrix into its component singular vectors such that the sum of the rank one matrices given by the outer products of the singular vectors multiplied by their corresponding singular values is the original matrix.

In step 130, a quantity k of singular values is selected to retain in a reduced rank matrix $A_{\tilde{k}}$ based on the singular values corresponding to the computed expected singular values of multiple topics. The selected k singular values will be used to form an approximation of the matrix A having a reduced rank of k, as discussed in more detail hereinafter with reference to step 150. The singular values can be selected based on the expected singular values of one or more topics. Exemplary steps for subroutine 130 are described hereinafter with reference to FIG. 2. The reduced rank matrix is referred to in the figures as $A_{\tilde{k}}$.

In step 140, the non-selected singular values are set to zero. Setting the non-selected singular values to zero effectively cancels the corresponding singular vectors related to those values from the term-by-document matrix A. With those values canceled, the reduced rank matrix $A_{\tilde{k}}$ can be calculated.

Then, in step 150, the reduced rank matrix $A_{\tilde{k}}$ is computed based on the k selected singular values. In this step, the reduced rank matrix $A_{\tilde{k}}$ is generated by recombining the k selected singular values and their corresponding singular vectors to compute the matrix $A_{\tilde{k}}$, which is a reduced rank approximation of the matrix A.

Since $A_{\tilde{k}}$ may be prohibitively large, it is also possible to use only the k selected singular vectors to perform data retrieval. In such an implementation, the reduced rank matrix may not be completely recombined, but instead the information from the matrix is used in its decomposed form.

In step 160, information retrieval is performed using the matrix $A_{\tilde{k}}$ in response to a query. Thus, queries to retrieve information from the original dataset are processed using the reduced rank approximation matrix $A_{\tilde{k}}$ or the k selected singular vectors instead of the original term-by-document matrix A.

Figure 2:
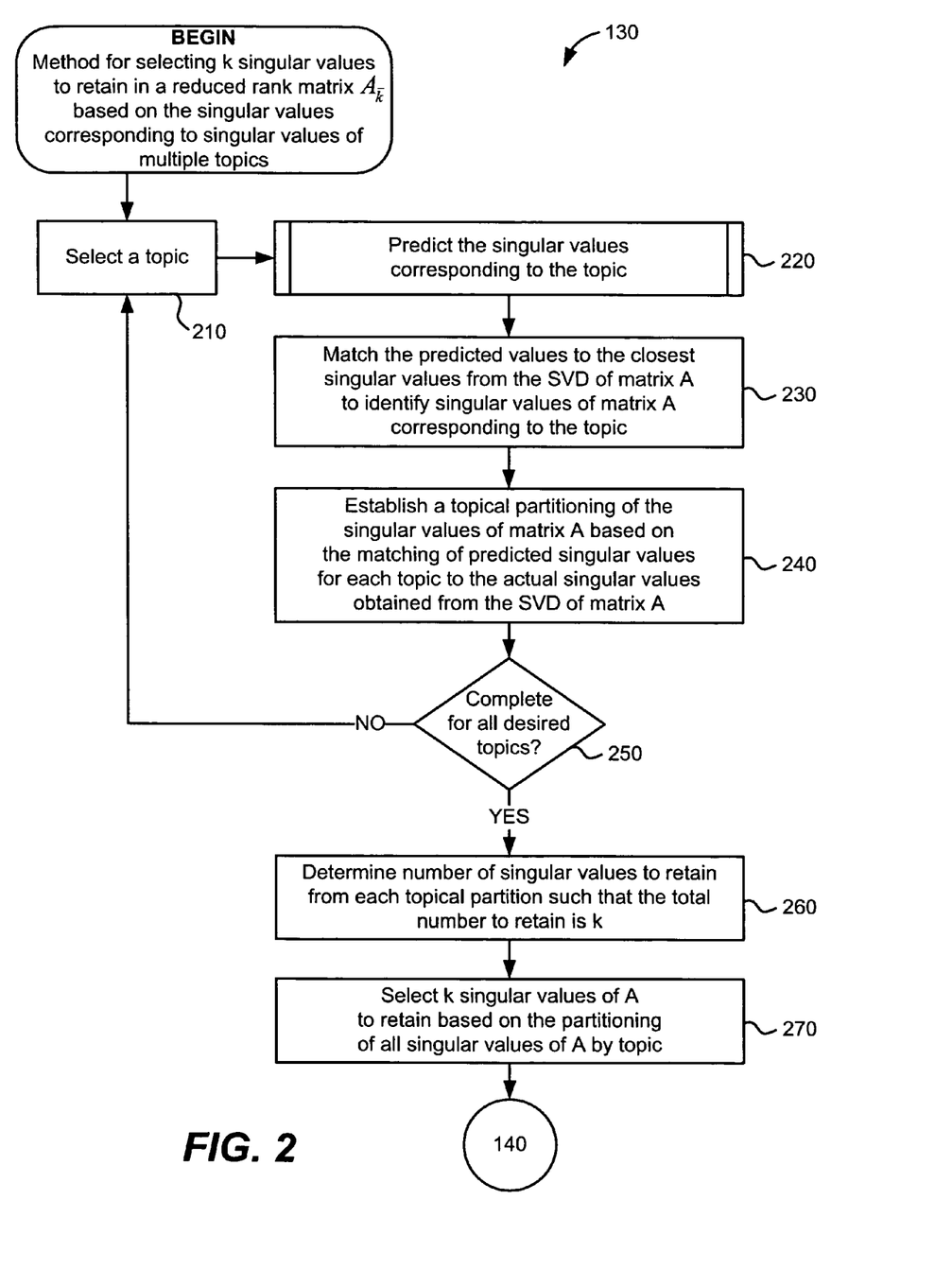
FIG. 2 is a logical flow diagram depicting a method for selecting k singular values based on their correspondence to singular values of multiple topics according to an exemplary embodiment of the invention.

One of ordinary skill in the art will appreciate that certain steps of this method can be reusable across repeated applications or iterations of the method 100 without departing from the scope or spirit of the present invention. For example, the reduced rank matrix $A_{\tilde{k}}$ developed in step 150 can be used repeatedly to process multiple information retrieval queries in step 160. Also, the singular values that are established for each of the topics in step 130 can be retained and applied to a new formation of matrix A to partition, by topic, the singular values of the new matrix A. In other words, a new matrix A formed in a later iteration of step 110 and its singular values computed in a later iteration of step 120 can use, in step 130, the same topical sets of singular values that were established in an earlier iteration of step 130 of the method 100. Essentially, the methods that calculate the estimated singular values in step 220 can be used for future matrices drawn from the same corpus model as in an earlier invocation of these steps.

FIG. 2 is a logical flow diagram depicting a method 130 for selecting a quantity k of singular values to retain in a reduced rank matrix $A_{\tilde{k}}$ based on the singular values corresponding to the computed singular values of multiple topics according to an exemplary embodiment. This method 130 is an exemplary embodiment of the subroutine 130 within the method 100 described with reference to FIG. 1. This exemplary method 130 can establish the correspondence between the singular values of the term-by-document matrix A and the topics covered by those documents. This correspondence can be accomplished by estimating the singular values of the topics. Other exemplary embodiments of subroutine 130, not using topical prediction, can be employed to select the singular values to retain based on their topical relationships. For example, the singular values corresponding to one or more topics may be known from models of the data set, other estimation procedures, or empirical calculations made directly on the actual data set or model data sets.

In step 210, a topic can be selected from the set of desired topics. The desired topics can comprise all topics covered by the documents or the desired topics can comprise a subset of topics such that only those topics desired within the reduced rank approximation of the term-by-document matrix are used for selecting the k singular values of the matrix A. Step 210 and decision step 250 form a loop over these desired topics.

For each iteration of this loop, steps 220, 230 and 240 can be performed for one of the topics.

In step 220, the singular values of the topic are estimated. This prediction is represented as a subroutine, exemplary steps of which are described hereinafter with reference to FIG. 3.

In step 230, the estimated singular values of the topic are compared to the actual singular values of the term-by-document matrix A to determine the actual singular values that correspond to the topic. The method of comparison can comprise finding the actual singular values of matrix A that are closest to the singular values estimated for the topic.

In step 240, the identification of actual singular values of matrix A that correspond to the estimated singular values for the topic are used to establish a topical partitioning of the singular values of matrix A. In other words, actual singular values that correspond to the estimated singular values for the topic can be identified and grouped to partition the selected topic from other topics represented in the matrix A. As the steps 220-240 are performed for multiple topics, the singular values of the term-by-document matrix A are partitioned into subsets of singular values that correspond to the topics covered by the documents.

In step 250, the method 130 determines whether the partitioning is complete for all desired topics. If not, then the method 130 branches back to step 210 to partition another topic. If yes, then the method 130 branches to step 260.

In step 260, the number of singular values to retain from each topical partition of the singular values of A is determined. The total number of these retained singular values is k (or less), where k is the desired rank of the reduced rank matrix $A_{\tilde{k}}$. In an exemplary embodiment, determining the number of singular values to retain from each topical partition can comprise taking the largest singular values from each topic partition in a quantity such that each topic is represented by a substantially equal number of singular values. Alternatively, determining the number of singular values to retain from each topical partition can comprise selecting different numbers of singular values from each topic. For example, this selection can be done by weighting the number of singular values selected from any given topic. This weighting can be made by the relevance of the topic, or the size of the topic, or by some other metric of topical importance. One of ordinary skill in the art will appreciate the application of various approaches to allocating the k singular values between the topics to establish representative distributions of singular values over the desired topics. Such alternative embodiments are within the scope and spirit of the present invention.

In step 270, the k singular values of A that are to be retained in the reduced rank approximation are selected. The numbers of singular values to retain from each topical partition that were determined in step 260 guide the selection of the particular k singular values. For example, if the method 130 determined in step 260 to retain the largest three singular values for each topic, then those singular values are selected for retention in step 270.

From step 270, the method 130 proceeds to step 140 (FIG. 1).

Figure 3:
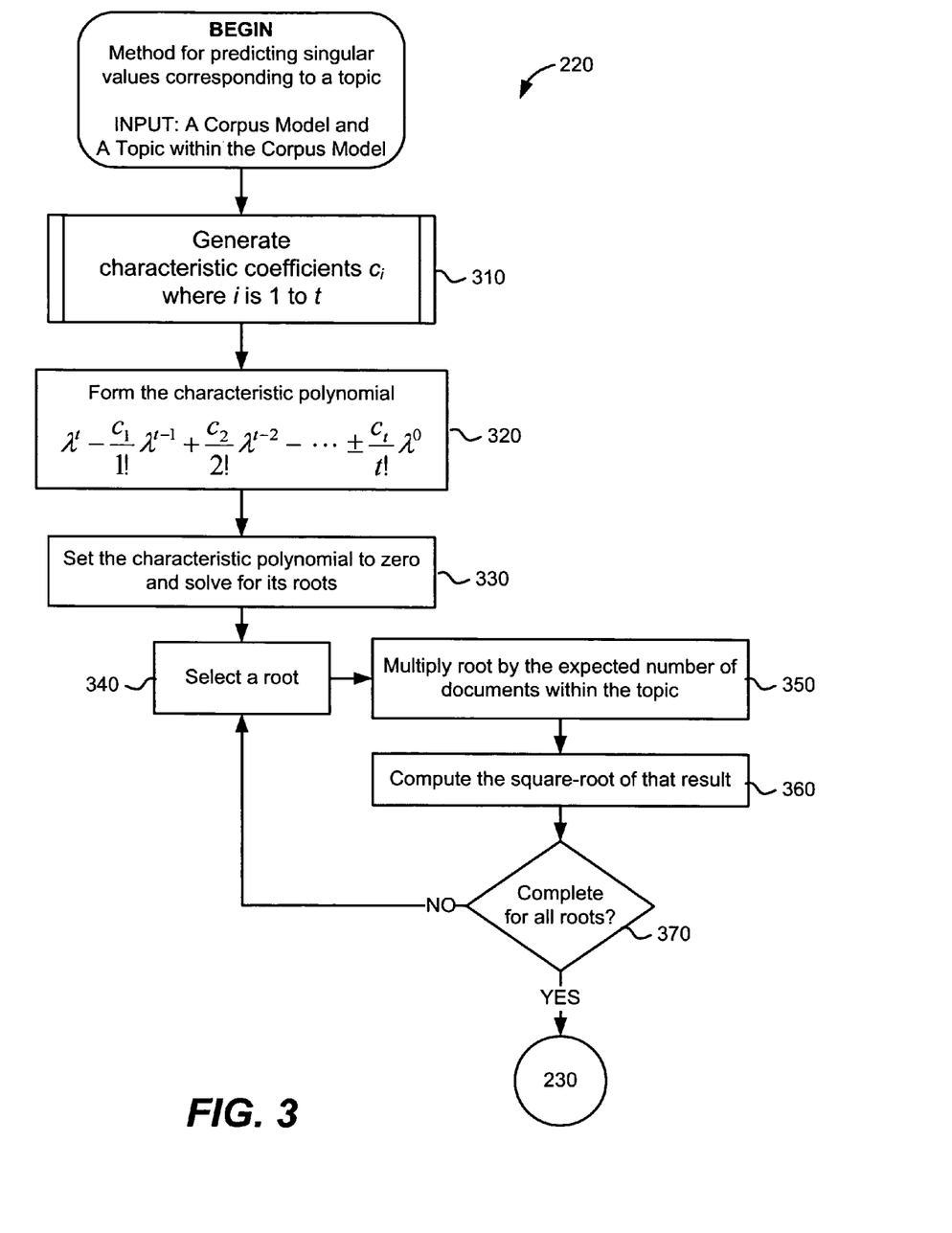
FIG. 3 is a logical flow diagram depicting a method for estimating the singular values of a topic according to an exemplary embodiment of the invention.

FIG. 3 is a flow chart depicting a method 220 for calculating the expected singular values corresponding to a topic according to an exemplary embodiment, as referred to in step 220 of FIG. 2. In step 310, a quantity t of partial characteristic coefficients $c_1$ through $c_t$ are generated, where t is the number of terms in the current topic. These t values are used in the calculation of partial coefficients of the terms in a specially formed characteristic polynomial detailed below in Equation 1. These $c_n$ values only represent partial coefficients because that are divided by a factorial to form the coefficients. A characteristic polynomial can be said to represent a matrix, or parameters thereof, in a polynomial form. Exemplary embodiments of step 310 will be described in more detail hereinafter with reference to FIGS. 4-6.

In step 320, the partial characteristic coefficients generated in step 310 are used to construct a specially formed characteristic polynomial illustrated in Equation 1 below.

$$\lambda^t - \frac{c_1}{1!}\lambda^{t-1} + \frac{c_2}{2!}\lambda^{t-2} - \ldots \pm \frac{c_t}{t!}\lambda^0 \quad (1)$$

In step 330, the roots of the polynomial are computed. One of ordinary skill in the art will appreciate various methods for computing the roots of a polynomial.

In step 340, one of the roots computed in step 330 is selected.

In step 350, the selected root is multiplied by the number of documents within the topic. If the information on the documents is from a statistical model rather than actual documents, this number of documents can be the expected number of documents within the topic. That is, if the documents within the data set are known and classified by topic then the number of documents within a topic can be counted, otherwise the expected number of documents within a given topic can be extracted by sampling or derived from a probabilistic model of the data.

In step 360, the square-root of the result obtained from step 350 is computed. The result from step 360 is one of the estimated singular values for the given topic.

Next, decision step 370 tests if any additional roots remain to be operated upon. If so, the method 220 branches back to step 340 where another root is selected to be operated on by steps 350 and 360. If not, then all of the roots have been operated on. These operations result in the full set of estimated singular values for the topic. Once this completion is determined, decision step 370 transitions to step 230 (FIG. 2).

Using method 220, the estimated singular values can be obtained for term-by-document matrices based upon any one of (0,1) elements, (−1,1) elements, various types of term frequency or term count representations, or any combinations, scaling, or functional transformations thereof. Thus, method 220 can be generalized for use with different forms of the term-by-document matrix.

Figure 4:
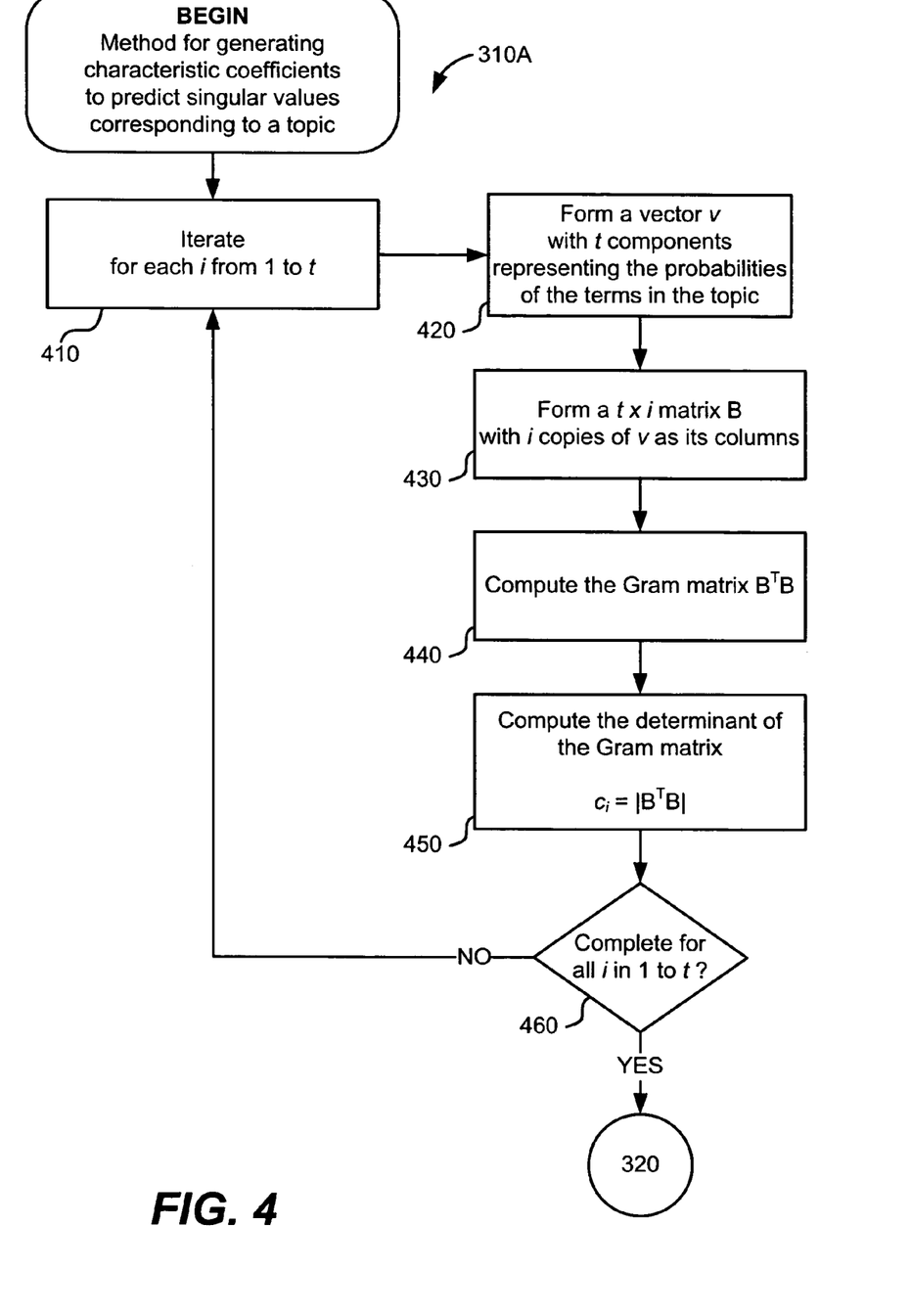
FIG. 4 is a logical flow diagram depicting a method for generating characteristic coefficients to estimate singular values corresponding to a topic according to an exemplary embodiment of the invention.

FIG. 4 is a flow chart depicting a method 310A for generating partial characteristic coefficients to estimate the singular values corresponding to a topic as referred to in step 310 of FIG. 3, according to an exemplary embodiment.

In step 410, a coefficient index i is selected from the range of one to t (inclusive of both one and t), where t is the number of terms in the current topic.

In step 420, a vector v is formed with t elements representing the probabilities of the terms in the topic. For example, if a first term is more likely to occur within a topic than a second term, then the element of vector v corresponding to the first term will be larger than the element of vector v corresponding to the second term.

In step 430, i copies of vector v are arranged as the columns of a matrix B that has quantity t rows and quantity i columns.

In step 440, the matrix transpose of B is multiplied by matrix B to form a Gram matrix, written as $B^T B$. The transpose of a first matrix is a second matrix, produced by turning the rows of the first matrix into the columns of the second matrix as to reflect the matrix about the diagonal that runs from the top left to bottom right of the matrix. In step 450, the determinant of the Gram matrix $B^T B$ is computed to identify the $i^{th}$ characteristic coefficient. In other words, for the index i selected in step 410, the determinant computed in step 450 is the $i^{th}$ characteristic coefficient, written as $c_i$.

Next, decision step 460 determines whether any additional indexes remain to be operated upon. If so, the loop beginning at step 410 is repeated for the next remaining index i. This loop is repeated until all indexes (one through t inclusive) have been operated upon. The results of the indexed iterations are the t partial characteristic coefficients used by method 220 in FIG. 3. The method 310A then proceeds to step 320 (FIG. 3).

Figure 5:
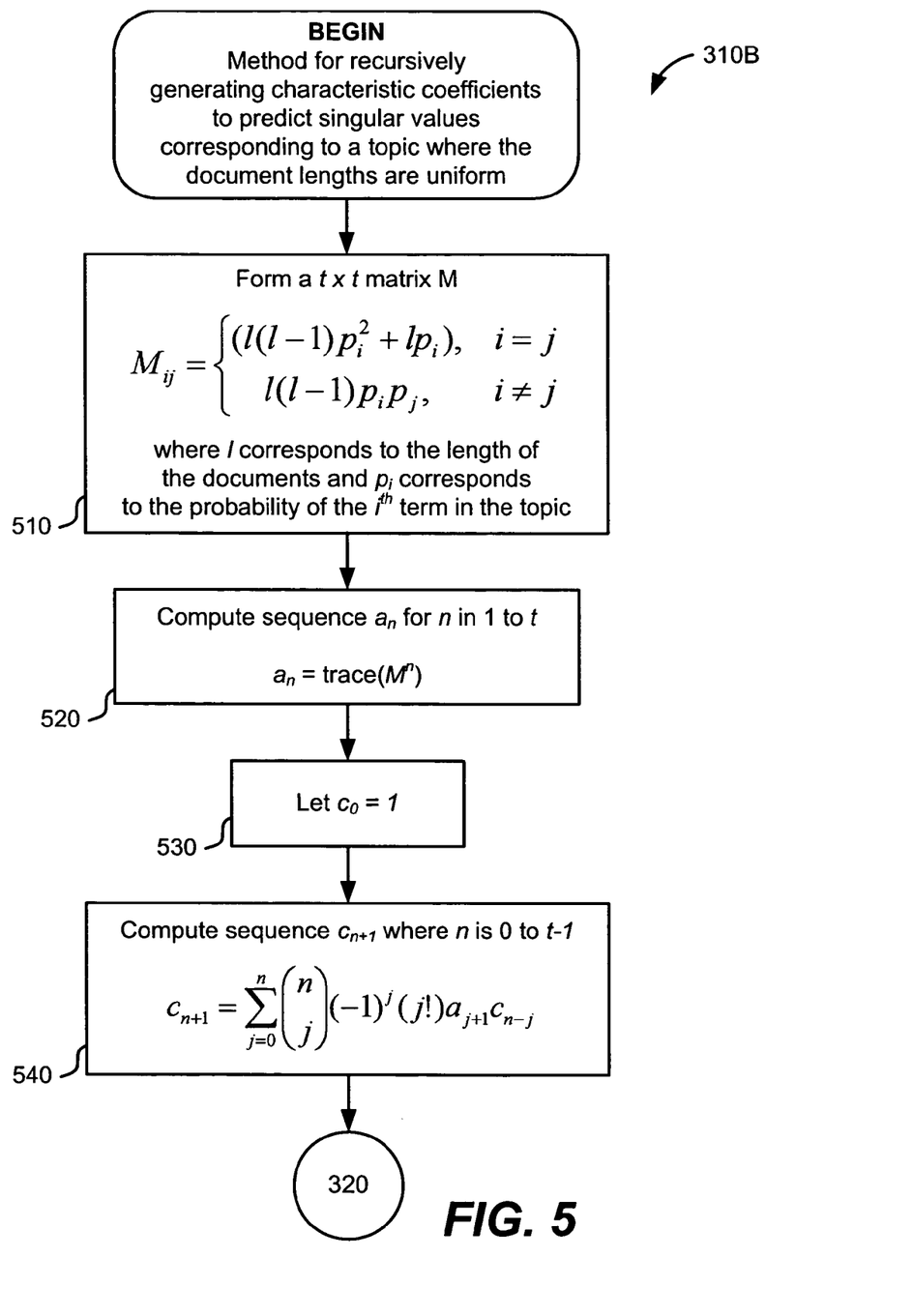
FIG. 5 is a logical flow diagram depicting a method for recursively generating characteristic coefficients to estimate the singular values corresponding to a topic where the document lengths are uniform according to an exemplary embodiment of the invention.

FIG. 5 is a flow chart depicting a method 310B for recursively generating partial characteristic coefficients to estimate the singular values corresponding to a topic where the document lengths are uniform, as referred to in step 310 of FIG. 3, according to an alternative exemplary embodiment. Recursion refers to generating partial characteristic coefficients such that each coefficient is based on those coefficients already computed.

While the resultant coefficients of method 310B may be equivalent to those generated by the exemplary method 310A described with reference to FIG. 3, the recursive approach can provide more accurate estimations and can be more computationally efficient.

In step 510, a square matrix M with t rows and t columns is formed by inserting the expected value of the product of the $i^{th}$ and $j^{th}$ terms into the $i^{th}$ and $j^{th}$ column of M. For example, in Equation 2, each element of the matrix M is formed such that i is the row of that element and j is the column of that element. In Equation 2, l corresponds to the length of the documents and $p_i$ corresponds to the probability of the $i^{th}$ term in the current topic being processed.

Equation 2 corresponds to an exemplary covariance expectation expression for the case where the term-by-document matrix is generated using term frequency counts. It should be noted that for any given matrix generation technique, only the matrix M need be changed. Therefore, by altering the M matrix in step 510, the estimated singular values can be obtained for term-by-document matrices based upon any one of (0,1) elements, (−1,1) elements, various types of term frequency or term count representations, or any combinations, scaling, or functional transformations thereof. Thus, method 220 can be generalized for use with different forms of the term-by-document matrix. Several alternative example formulations of the M matrix are addressed hereinafter.

$$M_{ij} = \begin{cases} (l(l-1)p_i^2 + lp_i), & i = j \\ l(l-1)p_i p_j, & i \neq j \end{cases} \quad (2)$$

In step 520, the sequence $a_n$ is computed according to the formula illustrated in Equation 3 below, where n ranges from one to t (inclusive of both one and t).

$$a_n = \text{trace}(M^n) \quad (3)$$

Each value in the sequence, $a_n$, is computed by raising the matrix M to the nth power and taking the trace of the resulting matrix as shown in Equation 3. One skilled in the art will recognize efficient techniques for accomplishing this task. One such technique is to sum the $n^{th}$ powers of the eigenvalues of M. The trace of a square matrix is defined to be the sum of the elements on the main diagonal of the matrix. The main diagonal of a square matrix is the diagonal from the upper left to the lower right.

In step 530, a coefficient of index zero, written as $c_0$, is initialized to the value of one. This coefficient forms the base of the recursion performed in step 540. Then, in step 540, the remaining coefficients up to $c_t$ are computed using the recursion illustrated in Equation 4 below.

$$c_{n+1} = \sum_{j=0}^{n} \binom{n}{j} (-1)^j (j!) a_{j+1} c_{n-j} \quad (4)$$

The recursion Equation 4 can compute the value of the coefficient $c_{n+1}$ using the value of the $n^{th}$ and lower coefficients. Thus, $c_1$ is computed using $c_0$, $c_2$ is computed using $c_0$ and $c_1$, and so on up to $c_t$. The results of this recursion are the t partial characteristic coefficients used by method 220 in FIG. 3. From step 540, the method 310B proceeds to step 320 (FIG. 3).

Figure 6:
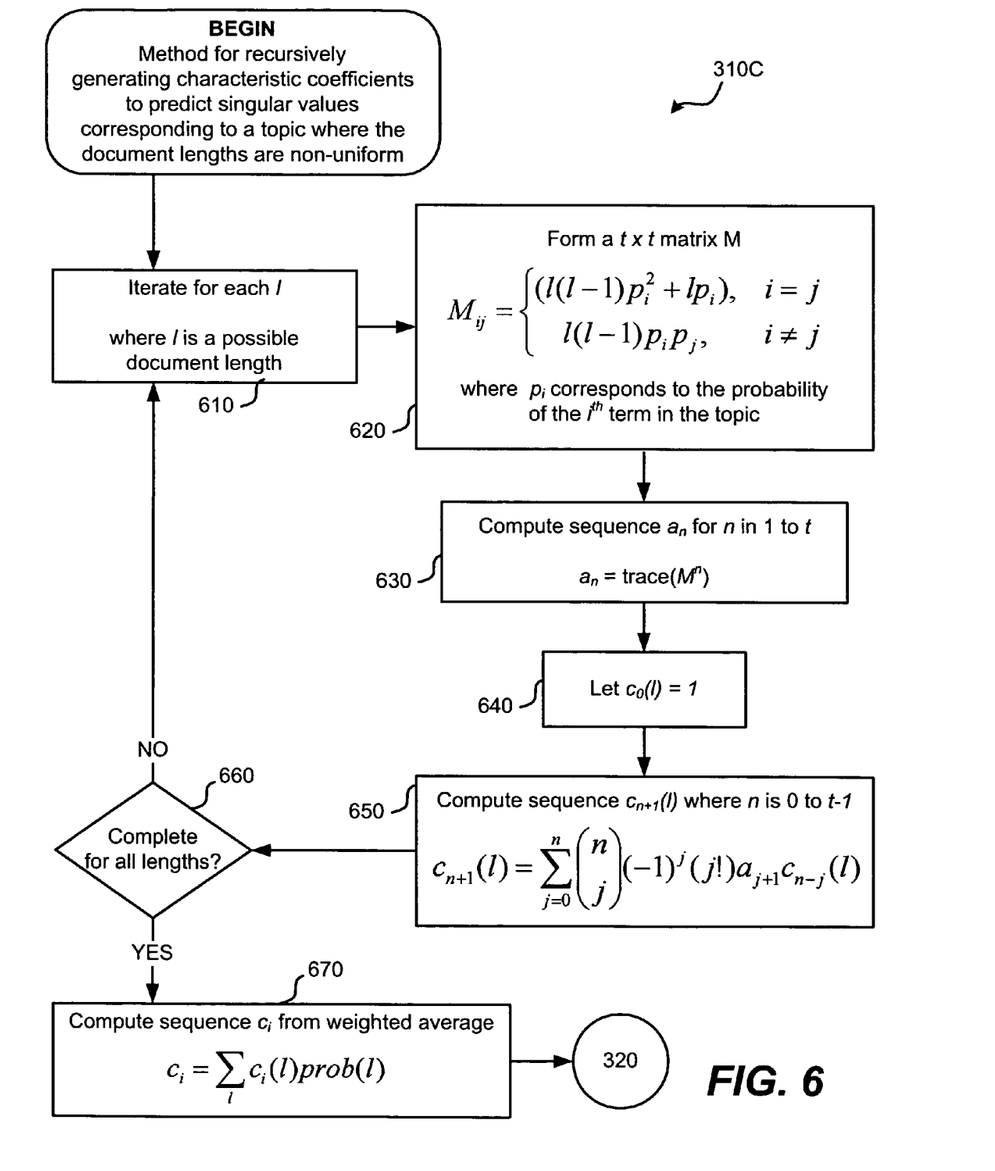
FIG. 6 is a logical flow diagram depicting a method for recursively generating characteristic coefficients to estimate the singular values corresponding to a topic where the document lengths are non-uniform according to an exemplary embodiment of the invention.

FIG. 6 is a flow chart depicting a method 310C for recursively generating partial characteristic coefficients to compute the expected singular values corresponding to a topic where the document lengths are not uniform, as referred to in step 310 of FIG. 3, according to another alternative exemplary embodiment. The method 310C can be considered a generalization of method 310B. While the method of 310B computes the partial characteristic coefficients when all of the documents are the same length, method 310C can compute the coefficients when the document lengths comprise a finite probability distribution. The lengths are the number of terms in a document and the probability distributions on lengths for each topic can come from the Corpus Model or can be estimated by sampling.

In step 610, a possible document length is selected.

In step 620, a square matrix M with t rows and t columns is formed according to the type of term-by-document matrix that is being analyzed. For example, a formula shown in Equation 2 above gives the formula for the entries when the term-by-document matrices are formed using term frequencies. As mentioned previously, any other type of matrix formulation technique could be substituted for this step by simply changing the way M is constructed. Several alternative example formulations of the M matrix are addressed hereinafter.

In step 630, the sequence an is computed where n ranges from one to t (inclusive of both one and t). Each value in the sequence an can be computed by raising the matrix M to the $n^{th}$ power and taking the trace of the resulting matrix as shown in Equation 3. One skilled in the art will recognize efficient techniques for accomplishing this task. One exemplary technique is to sum the $n^{th}$ powers of the eigenvalues of M.

In step 640, a coefficient of index zero, written as $c_0(l)$, is initialized to the value of one. This coefficient forms the base of the recursion performed in step 650. Then in step 650, the remaining coefficients up to $c_t(l)$ are computed using the recursion illustrated in Equation 5 below.

$$c_{n+1}(l) = \sum_{j=0}^{n} \binom{n}{j} (-1)^j (j!) a_{j+1} c_{n-j}(l) \quad (5)$$

The recursion Equation 5 can compute the value of the coefficient $c_{n+1}(l)$ using the value of the $n^{th}$ and lower coefficients. Thus, $c_1(l)$ is computed using $c_0(l)$, $c_2(l)$ is computed using $c_0(l)$ and $c_1(l)$, and so on up to $c_t(l)$. The results of this recursion are the t partial characteristic coefficients for the possible length given by l.

From step 650, decision step 660 determines if all possible lengths have been used for calculating a set of coefficients. If possible lengths remain, the method 310C loops back to step 610 where another possible length is selected for use in steps 620, 630, 640 and 650. If there are no possible lengths remaining to iterate, then the method 310C continues to step 670.

In step 670, the partial characteristic coefficients for each length (generated at each pass of step 650) can be combined together as a weighted sum according to the expression set forth in Equation 6 below.

$$c_i = \sum_l c_i(l) prob(l) \quad (6)$$

The weight of each term in the sum is the probability of a document of length l appearing within the topic. These probabilities can be derived by sampling, or can be given as inputs from the Corpus Model. The result of this weighted sum is one of the t partial characteristic coefficients used by method 220 in FIG. 3. From step 670, the method 310C proceeds to step 320 (FIG. 3).

As mentioned previously, the technique for forming the covariance expectation matrix M is based on the format of the term-by-document matrix A. For example, the formula shown in Equation 2 previously provides the formula for the entries of matrix M when the term-by-document matrix A is formed using term frequencies. Equation 7 below provides a format for elements of the M matrix when the term-by-document matrix elements are either zero or one indicating the presence or absence of a term in a document and when all terms are equally likely. In Equation 7, t is the number of terms, l is the length of the documents, and S(n,k) are the Stirling numbers of the second kind. Stirling numbers are sets of numbers well established in the field of combinatoric mathematics and known to one of ordinary skill on the art.

$$M_{ij} = \begin{cases} 1 - t^{-1}(t-1)^l, & i = j \\ \dfrac{t^l - 2(t-1)^l + (t-2)^l}{t^l} = \dfrac{\sum_{k=0}^{t-3} \binom{t-3}{k}(t-k-1)! S(l+1, t-k)}{t^l}, & i \neq j \end{cases} \quad (7)$$

Equation 8 below provides a format for elements of the M matrix when the term-by-document matrix elements are either zero or one indicating the presence or absence of a term in a document and when the terms each have their own corresponding probabilities. Here $p_i$ corresponds to the probability of the $i^{th}$ term in the current topic.

$$M_{ij} = \begin{cases} 1 - (1 - p_i)^l, & i = j \\ 1 - (1 - p_i)^l - (1 - p_j)^l - (1 - p_i - p_j)^l, & i \neq j \end{cases} \quad (8)$$

Equation 9 below provides a format for elements of the M matrix when the term-by-document matrix elements are either +1 or −1 indicating the presence or absence of a term in a document respectively.

$$M_{ij} = \begin{cases} 1, & i = j \\ 1 - 2(1-p_i)^l - 2(1-p_j)^l + 4(1-p_i-p_j)^l, & i \neq j \end{cases} \quad (9)$$

Equation 10 below provides a format for elements of the M matrix when the term-by-document matrix elements are the logarithm of the frequency of the term in a document. In Equation 10, $j_i$ corresponds to the number of times the $i^{th}$ term is chosen.

$$M_{ij} = \sum_{[j_1+\ldots+j_t=l]} \log j_i \log j_j \binom{l}{j_1 \ldots j_t} p_1^{j_1} \ldots p_t^{j_t} \quad (10)$$

Similarly, Equation 11 below provides a general, non-simplified, format for elements of the M matrix. In Equation 11, $j_i$ corresponds to the number of times the $i^{th}$ term is chosen.

$$M_{ij} = \sum_{[j_1+\ldots+j_t=l]} j_i j_j \binom{l}{j_1 \ldots j_t} p_1^{j_1} \ldots p_t^{j_t} \quad (11)$$

Figure 7:
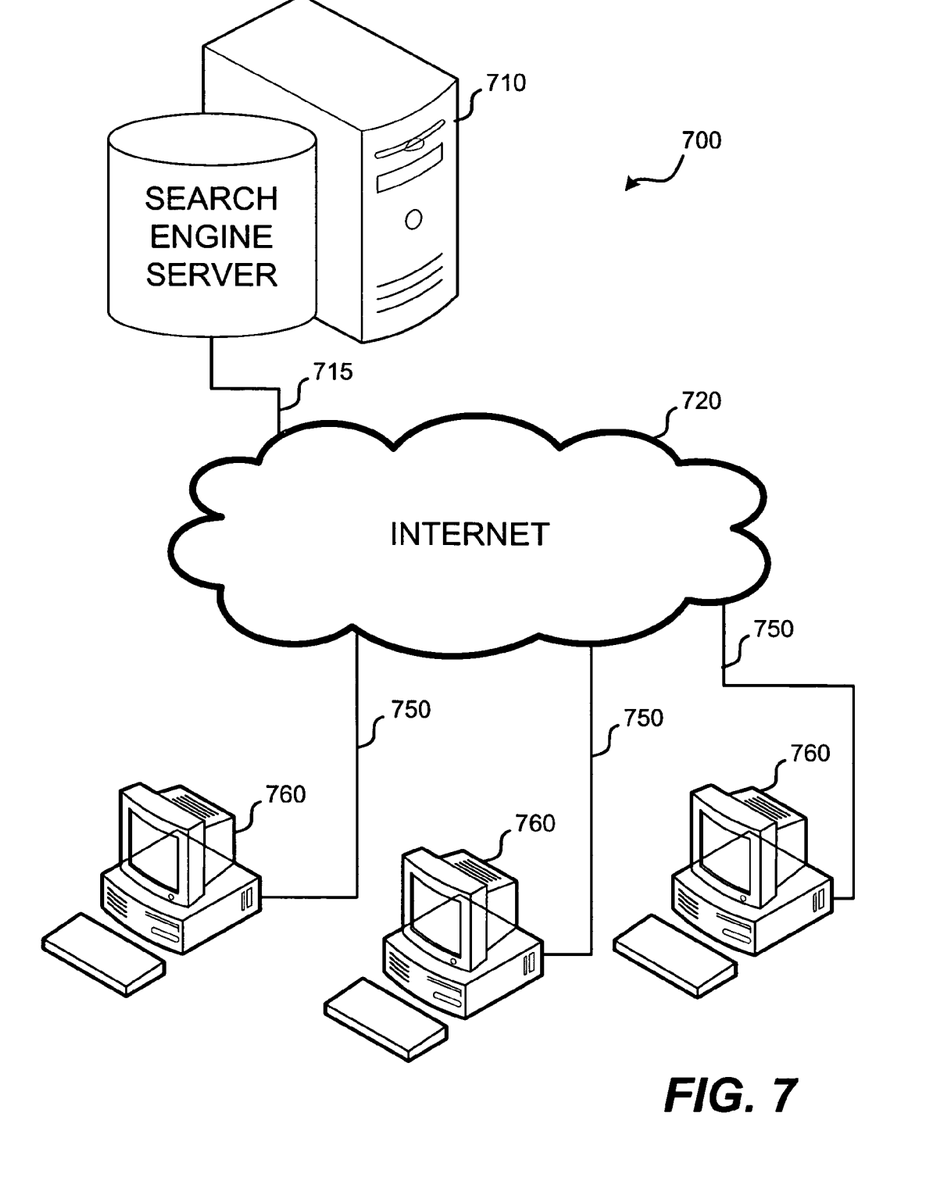
FIG. 7 is a functional block diagram depicting an Internet search engine system according to an exemplary embodiment of the invention.

FIG. 7 is a functional block diagram depicting an Internet search engine system according to an exemplary embodiment of the invention. An exemplary embodiment of the present invention can include one or more computer programs or computer-implemented methods that implement functions or steps described herein and illustrated in the exemplary flowcharts above. The computer program embodiment depicted in FIG. 7 is exemplary and is not intended to limit the inventive indexing method which can also be applied to genetics, bioinformatics, financial data, social science data, or numerous other data mining or information retrieval applications. Such applications can reside and operate on stand-alone, multi-processor, parallelized-processor, distributed, or networked system.

A search engine server 710 is connected to the Internet 720 over one or more communication links 715. The communication link 715 can include a path through an intranet, a private network, a telephony network, an Internet protocol ("IP") network, a packet-switched network, a circuit-switched network, a local area network ("LAN"), a wide area network ("WAN"), a metropolitan area network ("MAN"), the public switched telephone network ("PSTN"), a wireless network, a cellular system, an Ethernet network, or an ATM network, for example. The communication link 715 also can include a signal path that is optical, fiber optic, wired, wireless, wire-line, waveguided, satellite-based, synchronous, asynchronous, or isochronous to name a few possibilities, for example. Signals transmitting over the link 715 can carry or convey data or information digitally or via analog transmission. Such signals can include modulated electrical, optical, microwave, radiofrequency, ultrasonic, or electromagnetic energy, among other energy forms.

Search engine server 710 can scan information made available on other servers on the Internet (these other servers are not shown in FIG. 7). Search engine server 710 can form one or more term-by-document matrices A. Such a matrix A can represent the occurrence of terms in documents stored on the other servers attached to Internet 720. By examining the matrix A, search engine server 710 can respond to search queries. Such queries may request which documents on other servers contain a certain term. Such a keyword search query is typical of Internet search engine requests. These keyword searches can be issued to the search engine server 710 through the Internet 720. The searches can originate from user systems 760 that are connected to the Internet 720 by communication links 750.

Search engine server 710 may implement the method 100 detailed above. Use of this method can allow the search engine server 710 to reduce the complexity of its indexing matrix A so that keyword search queries may be serviced more efficiently. Method 100 can be used by search engine server 710 to reduce the rank of the indexing matrix without loss of the ability to respond to keyword search queries on particular topics. One of ordinary skill in the art will appreciate how the foregoing reduction in rank of an indexing matrix can be applied to an Internet search engine application as well as numerous other applications of data mining or information retrieval.

One of ordinary skill in the art also will appreciate that any of the foregoing techniques can provide indexing on terms or on documents. While the topic based estimations discussed above find clusters of documents, the same techniques can be used to find clusters of terms. Furthermore, some exemplary implementations of such methods may use both term and document clustering. These uses would not depart from the spirit or scope of the present invention.

Normalization steps that are common in matrix processing techniques are typically performed before and/or after matrix rank reductions. One of ordinary skill in the art will appreciate that any such normalization, scaling, filtering thresholding, or reformatting of the results or intermediate values obtained or used by the inventive methods or systems do not depart from the spirit or scope of the present invention.

Throughout all foregoing details of the inventive method, reference is made to terms, documents, term-by-document matrixes, topics, and corpus models. Use of this language is merely exemplary and is not intended to limit the information retrieval applications of the inventive methods to the realm of documents made up of words or terms. One of ordinary skill in the art will appreciate, without departure from the scope or spirit of the invention, the generalization of these terms to other information retrieval applications. For example the usage (term, document, topic, corpus model) can be generalized respectively to (element, collection, probabilistic distribution on elements, probabilistic matrix model). This generalization can be re-applied in various application realms, for example, in genetics or bioinformatics the usage can be (gene, individual, expression, population model). An example from the realm of chemistry can be (atom, molecule, classification of chemical, molecular model). Any number of other examples can be drawn from the fields of science, social-sciences, finance, economics, computer science, or otherwise where information representing collections of elements can be indexed and sets of collections categorized by an analogy to the notion of topics. These varied applications of the inventive method are within the scope and spirit of the invention as the invention is not to be limited by any use herein of exemplary language from the realm of term and document indexing or otherwise.

Although specific embodiments of the present invention have been described herein in detail, the description is merely for purposes of illustration. The exemplary methods described herein are merely illustrative and, in alternative embodiments of the invention, certain steps can be performed in a different order, performed in parallel with one another, or omitted entirely, and/or certain additional steps can be performed without departing from the scope and spirit of the invention. Additionally, various modifications of, and equivalent steps corresponding to, the disclosed aspects of the exemplary embodiments, in addition to those described herein, can be made by those skilled in the art without departing from the spirit and scope of the present invention defined in the following claims, the scope of which is to be accorded the broadest interpretation so as to encompass such modifications and equivalent structures.

What is claimed is:

1. A method for generating a reduced rank approximation for information retrieval, comprising:
forming on a computer a term-by-document matrix A, wherein the elements of the matrix A represent a plurality of terms within a plurality of documents, the documents related to a plurality of topics;
estimating via the computer a plurality of singular values corresponding to at least one of the topics;
identifying via the computer a plurality of actual singular values each having a corresponding singular vector associated with the matrix A;
selecting via the computer a subset of the actual singular values based on actual singular values that correspond to at least one of the estimated singular values; and
determining via the computer a set of singular vectors based on the selected singular values, wherein the singular vectors provide an index for use during information retrieval.

2. The method of claim 1, further comprising the step of computing a reduced rank approximation based on the selected singular values and the selected singular vectors, the reduced rank approximation providing an index for use during information retrieval.

3. The method of claim 1, further comprising the step of identifying a probabilistic matrix model, the model comprising at least one of a plurality of probabilities representing the number of occurrences of the terms within the documents.

4. The method of claim 1, wherein the selecting step further comprises matching the estimated singular values corresponding to one or more topics with the actual singular values of matrix A.

5. The method of claim 1, wherein the selecting step further comprises selecting a plurality of actual singular values of matrix A that each correspond to at least one of the estimated singular values, the actual singular values corresponding to at least one of the topics.

6. The method of claim 1, wherein the step of estimating singular values corresponding to a topic comprises the steps of:
generating characteristic coefficients;
forming a special characteristic polynomial based on the characteristic coefficients; and
solving for the roots of the characteristic polynomial, wherein multiplying the roots by the number of documents related to the topic and then taking a square-root yields the estimated singular values.

7. The method of claim 6, wherein the step of generating characteristic coefficients comprises, for each coefficient:
forming a vector representing probabilities of the terms in the documents;
forming a matrix B with copies of the vector as its columns; and
computing the determinant of the Gram matrix given by $|B^TB|$ to generate each coefficient.

8. The method of claim 6, wherein the step of generating characteristic coefficients comprises computing a recursion such that each coefficient is based on those coefficients already computed.

9. The method of claim 8, wherein the step of generating characteristic coefficients further comprises computing a probabilistically weighted average of coefficients based on the probability of document length, the weighted averaging allowing the method to function with documents of non-uniform lengths.

10. A method for generating a reduced rank approximation for information retrieval, comprising:
forming on a computer a part-by-collection matrix A, wherein the elements of the matrix represent the existence of one or more parts within one or more collections;
estimating via the computer a plurality of singular values corresponding to at least one of a plurality of probabilistic distributions on parts;
identifying via the computer a plurality of actual singular values each having a corresponding singular vector;
selecting via the computer a subset of the actual singular values based on actual singular values that correspond to at least one of the estimated singular values; and
determining via the computer a set of singular vectors based on the selected singular values, wherein the singular vectors provide an index for use during information retrieval.

11. The method of claim 10, further comprising the step of computing a reduced rank approximation based on the selected singular values and the selected singular vectors, the reduced rank approximation providing an index for use during information retrieval.

12. The method of claim 10, further comprising the step of identifying a probabilistic matrix model, the model comprising one or more probabilities representing the number of occurrences of one or more parts within one or more collections, the collections relating to a probabilistic distribution on parts.

13. The method of claim 10, wherein the selecting step comprises matching the estimated singular values corresponding to at least one of a plurality of probabilistic distributions on parts with the actual singular values of matrix A.

14. The method of claim 11, wherein the selecting step comprises selecting at least one of the actual singular values of matrix A that substantially equal at least one of the estimated singular values corresponding to at least one of the probabilistic distributions on parts.

15. The method of claim 11, wherein the step of estimating singular values corresponding to a probabilistic distribution on parts comprises the steps of:
generating characteristic coefficients;
forming a characteristic polynomial; and
solving for the roots of the characteristic polynomial, wherein multiplying the roots by the number of collections related to the probabilistic distribution on parts and then taking a square-root yields the estimated singular values.

16. The method of claim 15, wherein the step of generating characteristic coefficients comprises, for each coefficient:
forming a vector representing probabilities of the parts;
forming a matrix B with copies of the vector as its columns; and
computing the determinant of the Gram matrix given by $|B^TB|$ to generate each coefficient.

17. The method of claim 16, wherein the step of generating characteristic coefficients comprises computing a recursion such that each coefficient is based on those coefficients already computed.

18. The method of claim 17, wherein the step of generating characteristic coefficients further comprises computing a probabilistically weighted average of coefficients based on the probability of collection size, the weighted averaging allowing the method to function with collections of non-uniform sizes.

19. A method for reducing the rank of a matrix A for information retrieval, comprising:
- determining via a computer a plurality of probabilistic distributions on parts;
- estimating via the computer a plurality of singular values corresponding to at least one of a plurality of probabilistic distributions on parts;
- identifying via the computer a plurality of actual singular values each having a corresponding singular vector associated with the matrix A;
- grouping via the computer the singular values of matrix A based on the singular values of matrix A that correspond to at least one of the estimated singular values; and
- computing via the computer the reduced rank approximation based on the grouping of the singular values, wherein the reduced rank approximation provides an index for use during information retrieval.

20. The method of claim 19, wherein the grouping step comprises estimating singular values corresponding to at least one of the probabilistic distributions on parts and selecting actual singular values of matrix A that correspond to the estimated singular values.

21. The method of claim 20, wherein the selecting step comprises matching the estimated singular values corresponding to at least one of the probabilistic distributions on parts with the actual singular values of matrix A.

22. The method of claim 20, wherein the step of estimating singular values corresponding to a probabilistic distributions on parts comprises the steps of:
- generating characteristic coefficients;
- forming a special characteristic polynomial; and
- solving for the roots of the characteristic polynomial, wherein multiplying the roots by the number of samples related to corresponding probabilistic distributions on parts and then taking a square-root yields the estimated singular values.

23. The method of claim 22, wherein the step of generating characteristic coefficients comprises, for each coefficient:
- forming a vector representing probabilities of the parts;
- forming a matrix B with copies of the vector as its columns; and
- computing the determinant of the Gram matrix given by $|B^T B|$ to generate each coefficient.

24. The method of claim 22, wherein the step of generating characteristic coefficients comprises computing a recursion such that each subsequent coefficient is based on at least one coefficient already computed.

25. The method of claim 24, wherein the step of generating characteristic coefficients further comprises computing a probabilistically weighted average of coefficients based on the probability of sample length, the weighted averaging allowing the method to function with samples of non-uniform lengths.

26. The method of claim 21, wherein the identifying step comprises performing a singular value decomposition of the matrix A to identify a plurality of actual singular values each having a corresponding singular vector.

27. The method of claim 19, wherein the computing step further comprises selecting at least one of the singular values grouped to correspond to a probabilistic distributions on parts, wherein the selecting step selects the singular values to be computed into the reduced rank approximation to maintain or remove the indexing of the probabilistic distributions on parts for use in information retrieval.

28. A method for identifying on a computer singular values to generate a reduced rank approximation of a term-by-document matrix for use in information retrieval, comprising the steps of estimating via a computer a plurality of singular values of the matrix, and generating via the computer the reduced rank matrix based on the estimated singular values.

29. A method for generating a reduced rank approximation for information retrieval, comprising:
- forming on a computer a term-by-document matrix A, wherein the elements of the matrix A represent a plurality of terms within a plurality of documents, each of the documents being related to at least one of plurality of topics;
- identifying via the computer a plurality of actual singular values each having a corresponding singular vector;
- estimating via the computer a plurality of estimated singular values each corresponding to at least one of the topics;
- selecting via the computer at least one of the actual singular values based on the estimated singular values; and
- generating via the computer a reduced rank approximation based on the selected singular values, wherein the reduced rank approximation provides an index for use during information retrieval.

* * * * *